United States Patent
Dumdei et al.

(10) Patent No.: US 12,526,062 B2
(45) Date of Patent: Jan. 13, 2026

(54) CALIBRATING PRIMARY AND AUXILIARY MULTIPLE INPUT MULTIPLE OUTPUT RADIOS

(71) Applicant: Cisco Technology, Inc., San Jose, CA (US)

(72) Inventors: Alan W. Dumdei, Greenville, TX (US); Malcolm M. Smith, Richardson, TX (US); Brian D. Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 125 days.

(21) Appl. No.: 18/589,344

(22) Filed: Feb. 27, 2024

(65) Prior Publication Data

US 2025/0274202 A1     Aug. 28, 2025

(51) Int. Cl.
*H04B 17/21* (2015.01)
*H04B 17/20* (2015.01)

(52) U.S. Cl.
CPC ............ *H04B 17/21* (2015.01); *H04B 17/25* (2023.05)

(58) Field of Classification Search
CPC ...... H04B 17/21; H04B 17/25; H04L 25/0204
USPC ......................................................... 375/224
See application file for complete search history.

(56) References Cited

U.S. PATENT DOCUMENTS

| | | |
|---|---|---|
| 9,900,112 B1 | 2/2018 | Shteiman et al. |
| 2002/0196186 A1* | 12/2002 | Holt .................. G01S 5/021 |
| | | 342/453 |
| 2017/0048001 A1* | 2/2017 | Wayne ............... H04B 10/1121 |
| 2019/0288780 A1 | 9/2019 | Rodriguez-Herrera et al. |
| 2021/0367648 A1 | 11/2021 | Aue |
| 2023/0067500 A1 | 3/2023 | Yuan et al. |

FOREIGN PATENT DOCUMENTS

EP          3618314 A1    3/2020

* cited by examiner

*Primary Examiner* — Leila Malek
(74) *Attorney, Agent, or Firm* — Patterson + Sheridan, LLP

(57) ABSTRACT

Techniques for calibrating in-band and out-of-band receivers using complex signals. The techniques include receiving a signal from a wireless radio antenna at a first receiver and a second receiver in a wireless communication system. The first receiver is configured to receive in-band transmission during operation of the wireless communication system and the second receiver is configured to receive out-of-band transmission during operation of the wireless communication system, and the signal is transmitted at least partially simultaneously from the wireless radio antenna to the first receiver and the second receiver. The techniques further include determining a difference of complex signals for the first receiver and the second receiver based on measuring the signals received from the wireless radio antenna at the first receiver and the second receiver, and calibrating the second receiver with the first receiver based the difference of complex signals.

20 Claims, 6 Drawing Sheets

CALIBRATING PRIMARY AND AUXILIARY MULTIPLE INPUT MULTIPLE OUTPUT RADIOS

TECHNICAL FIELD

Embodiments presented in this disclosure generally relate to wireless communications. More specifically, one or more embodiments disclosed herein relate to radio calibration.

BACKGROUND

Existing wireless access point (AP) roaming and link selection (e.g., for multi-link devices (MLD) and multi-link operation (MLO)) is typically based on characteristics (e.g., received signal strength indication (RSSI), signal to noise ratio (SNR), or both) of an AP's single input multiple output (SIMO) beacon. This can be sufficient for low-speed and stable channels. But for higher speed channels (e.g., unstable or non-line-of-sight (NLOS) channels), and multiple-input-multiple-output (MIMO)) devices, RSSI and SNR (e.g., for a SIMO beacon) may not be sufficient.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
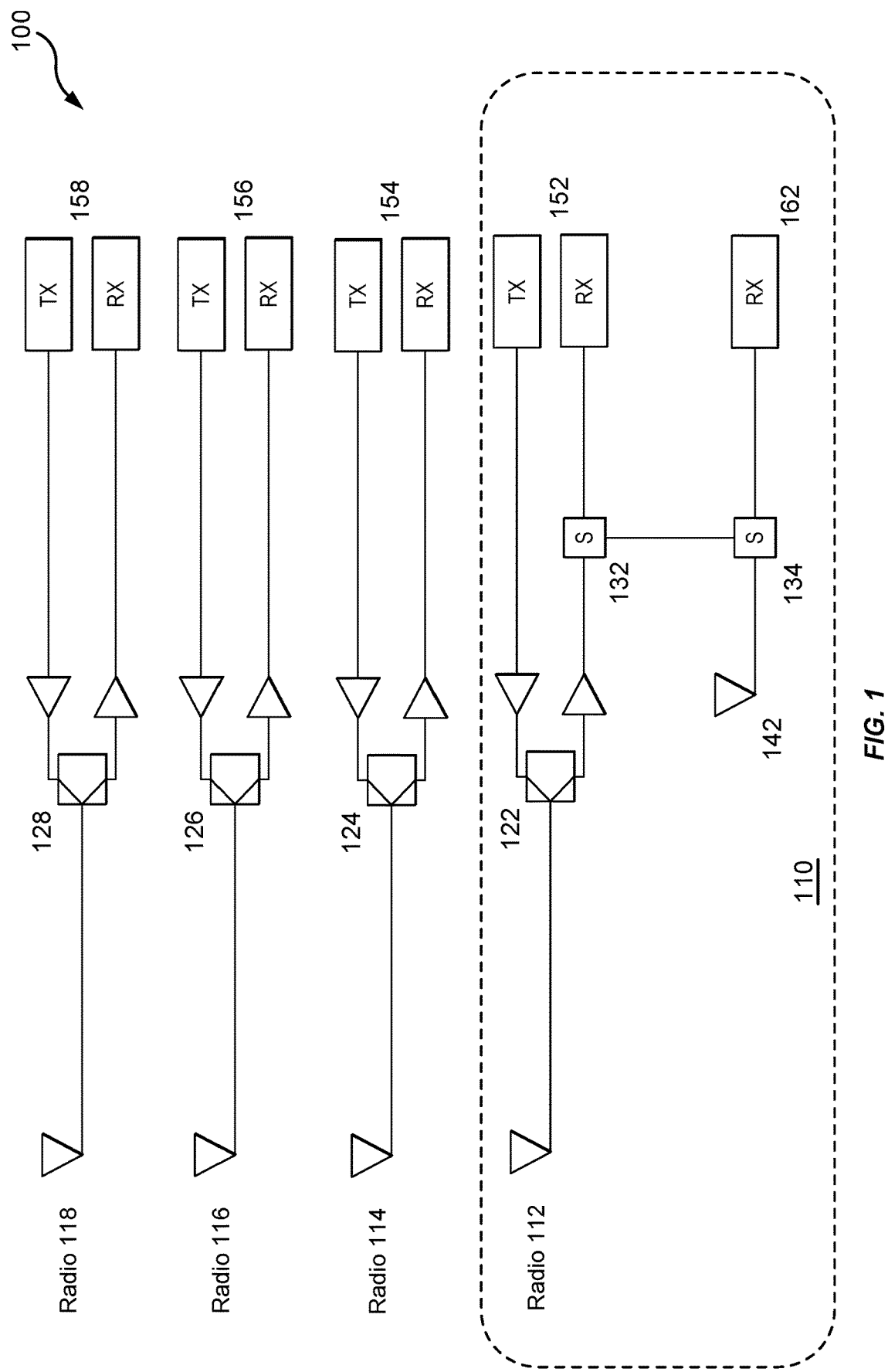
FIG. 1 illustrates primary and auxiliary radios for wireless communication, according to one embodiment.

Embodiments include a method. The method includes receiving a signal from a wireless radio antenna at a first receiver and a second receiver in a wireless communication system. The first receiver is configured to receive in-band transmission during operation of the wireless communication system and the second receiver is configured to receive out-of-band transmission during operation of the wireless communication system, and the signal is transmitted at least partially simultaneously from the wireless radio antenna to the first receiver and the second receiver. The method further includes determining a difference of complex signals for the first receiver and the second receiver based on measuring the signals received from the wireless radio antenna at the first receiver and the second receiver. The method further includes calibrating the second receiver with the first receiver based the difference of complex signals.

Embodiments further include a wireless communication system, including a wireless radio antenna, a first receiver, a second receiver, one or more processors, and one or more memories storing a program, which, when executed on any combination of the one or more processors, performs operations. The operations include receiving a signal from the wireless radio antenna at the first receiver and the second receiver in the wireless communication system. The first receiver is configured to receive in-band transmission during operation of the wireless communication system and the second receiver is configured to receive out-of-band transmission during operation of the wireless communication system, and the signal is transmitted at least partially simultaneously from the wireless radio antenna to the first receiver and the second receiver. The operations further include determining a difference of complex signals for the first receiver and the second receiver based on measuring the signals received from the wireless radio antenna at the first receiver and the second receiver. The operations further include calibrating the second receiver with the first receiver based the difference of complex signals.

Embodiments further include a non-transitory computer-readable medium containing computer program code that, when executed by operation of one or more computer processors, performs operations. The operations include receiving a signal from a wireless radio antenna at a first receiver and a second receiver in a wireless communication system. The first receiver is configured to receive in-band transmission during operation of the wireless communication system and the second receiver is configured to receive out-of-band transmission during operation of the wireless communication system, and the signal is transmitted at least partially simultaneously from the wireless radio antenna to the first receiver and the second receiver. The operations further include determining a difference of complex signals for the first receiver and the second receiver based on measuring the signals received from the wireless radio antenna at the first receiver and the second receiver. The operations further include calibrating the second receiver with the first receiver based the difference of complex signals.

Example Embodiments

In an embodiment, an auxiliary radio (e.g., an auxiliary radio on a wireless station (STA), AP, or any other suitable device) can be used to characterize the spatial characteristics (e.g., the complex signal characteristics) of an out-of-band channel (e.g., a channel not currently serving traffic). For example, an auxiliary receiver on an STA can be used to assess the spatial characteristics of an out-of-band sounding signal. That information can then be used to identify the best channels for selection by a wireless device (e.g., an AP acting as a workgroup bridge (WGB)) and pre-determine the beamforming weights for the client, or for any other suitable purpose.

For example, an auxiliary receiver (e.g., on the STA, WGB, or any other suitable device) can be used to characterize the spatial characteristics of an out-of-band channel. A wireless device can use this to identify the best uplink channel, based on a full understanding of the spatial characteristics of the channel. While RSSI by itself can provide a rough estimate of a channel, having a full understanding of the spatial characteristics of the channel allows the client to make a better decision (e.g., based on stability, capacity, or any other suitable criteria or combination of criteria). For example, a channel with the best RSSI may not have the best MIMO channel characteristics (e.g. one link could be line-of-sight (LOS) and one could be behind a tree, but the links might have similar RSSI). In addition, identifying the spatial characteristics of the out-of-band channel can be used to establish uplink beamforming weights, even prior to roaming. Thus, the initial roam can have a higher success rates and higher capacity without the need for additional channel sounding and estimating.

In an embodiment, an AP can send a sounding message (e.g., a null data packet (NDP) or null data packet announcement (NDPA)) based on a trigger. This trigger can be periodic (e.g., as part of existing beacon reports or other transmissions) or could be requested by a client on an existing AP. The auxiliary receiver can compute spatial weights based on the received signal and a set of calibrated values used to normalize the signal. In an embodiment, the client (e.g., a WGB, mesh AP, or any other suitable wireless device) establishes a spatial channel assessment off channel (e.g., using an out-of-band signal). The client can then then use this information to make better a roaming decision (improving things like MIMO) and can pre-establish beamforming weights so that initial in-band communications can have client beamforming enabled.

In an embodiment, the calibrated values used to compute spatial weights can be identified by calibrating the auxiliary receiver with the primary receiver, as discussed below in relation to FIGS. 3-6. The calibration can occur during manufacturing, or during operation. For example, to achieve direct correlation between two receivers (e.g., primary and auxiliary receivers) the auxiliary receiver can be calibrated so that the signals received at the auxiliary radio (e.g., the out-of-band receiver) are correlated to the signals received at the primary radio (e.g., the in-band receiver).

Figure 3:
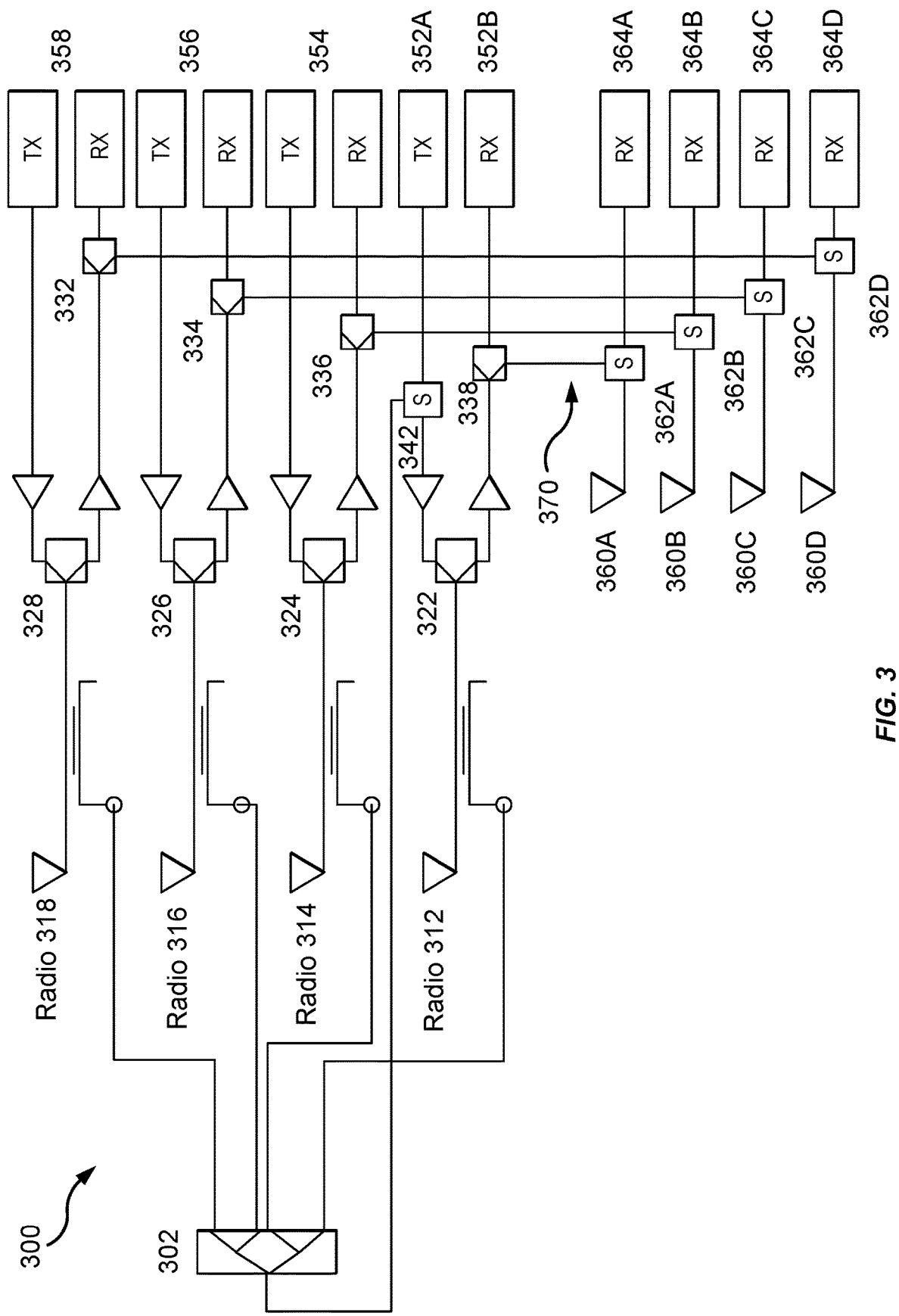
FIG. 3 illustrates calibrating primary and auxiliary receivers for wireless communication, according to one embodiment.

In an embodiment, this is done by sharing an antenna between the primary and auxiliary receivers. This is illustrated in FIGS. 1, 3, and 5, as one example. Further, a system can calculate the difference between the signal chains (e.g., the in-band signal chain and the out-of-band signal chain) in complex parameter format. This is discussed further, below, with regard to FIGS. 3-6. In an embodiment, a power splitter and combiner is used to allow both signal chains to share the common antenna. During calibration (e.g., calibration during manufacturing or during operation) a sounding signal is injected into the antenna path (e.g., the antenna port of the receiver), and the signal is then received on both the primary and auxiliary receiver at the same time. These signals can then be compared (e.g., using the techniques discussed below in relation to FIG. 5), and the differences can be stored as weights.

FIG. 1 illustrates primary and auxiliary radios for wireless communication, according to one embodiment. In an embodiment a system 100 includes a four stream receiver. The system 100 receives samples from four radios 112, 114, 116, and 118 (e.g., any, or all, of the four radios 112, 114, 116, and 118), to identify the best channels for selection by a wireless device, pre-determine beamforming weights for an STA, or for any other suitable purpose (e.g., as discussed above).

The system 100 can capture these samples on both in-band receivers (e.g., primary receivers 152, 154, 156, and 158) and out-of-band receivers (e.g., one or more auxiliary receivers 165), as discussed below. Further, in an embodiment, the system 100 captures complex signals on both the in-band and out-of-band receivers (e.g., not just magnitude of an RSSI). This complex signal information, along with the calibration in path differences between in-band and out-of-band receivers discussed below in relation to FIGS. 3-6, allows the out-of-band receiver to compute the same spatial matrix as the in-band receiver.

In further detail, as illustrated in FIG. 1 each radio 112, 114, 116, and 118 is associated with a respective receiver/transmitter chain, including a respective coupler 122, 124, 126, or 128, and a respective receiver/transmitter 152, 154, 156, or 158. For example, the radio 118 is associated with the coupler 128 and the receiver/transmitter 158. The radio 116 is associated with the coupler 126 and the receiver/transmitter 156. The radio 114 is associated with the coupler 124 and the receiver/transmitter 154. The radio 112 is associated with the coupler 122 and the receiver/transmitter 152. In an embodiment, each coupler 122, 124, 126, and 128 is a passive coupler. For example, the couplers 122, 124, 126, and 128 can be passive printed circuit board (PCB) couplers with very high isolation (e.g., 40 dB or higher). This is merely an example, and any suitable coupler or combination of couplers can be used.

A receiver/transmitter chain 110 includes the radio 112, the coupler 122, and the receiver/transmitter 152. In an embodiment, the chain 110 further includes a switch 132, a switch 134, and an additional radio 142 (e.g., an auxiliary radio 142). In an embodiment, the auxiliary radio 142 is an out-of-band radio used for spatial assessment of in band radios (e.g., the radio 112). The out-of-band auxiliary receiver 162 can be calibrated with the in-band receiver 152 by injecting a reference signal from a shared antenna (e.g., the radio 112), and using the reference signal to calibrate the difference (e.g., the complex signal difference) between the in-band receiver 152 and the out-of-band receiver 162. This is discussed further, below, with regard to FIGS. 3-6.

For example, the switches 132 and 134 can be used to control injection of the reference signal from the radio 112 to both the receiver 152 and the receiver 162, for calibration between the receiver 152 and the receiver 162. These signals received at the receivers 152 and 162, from the shared radio 112 (e.g., a shared antenna), can then be compared to calibrate the receivers. In an embodiment, calibration can be performed during manufacturing of the system 100, and during operation. For example, initial calibration could be performed during manufacturing of the system 100. Ongoing calibration could then be performed during operation (e.g., at startup and under certain conditions, including temperature extremes).

Figure 2:
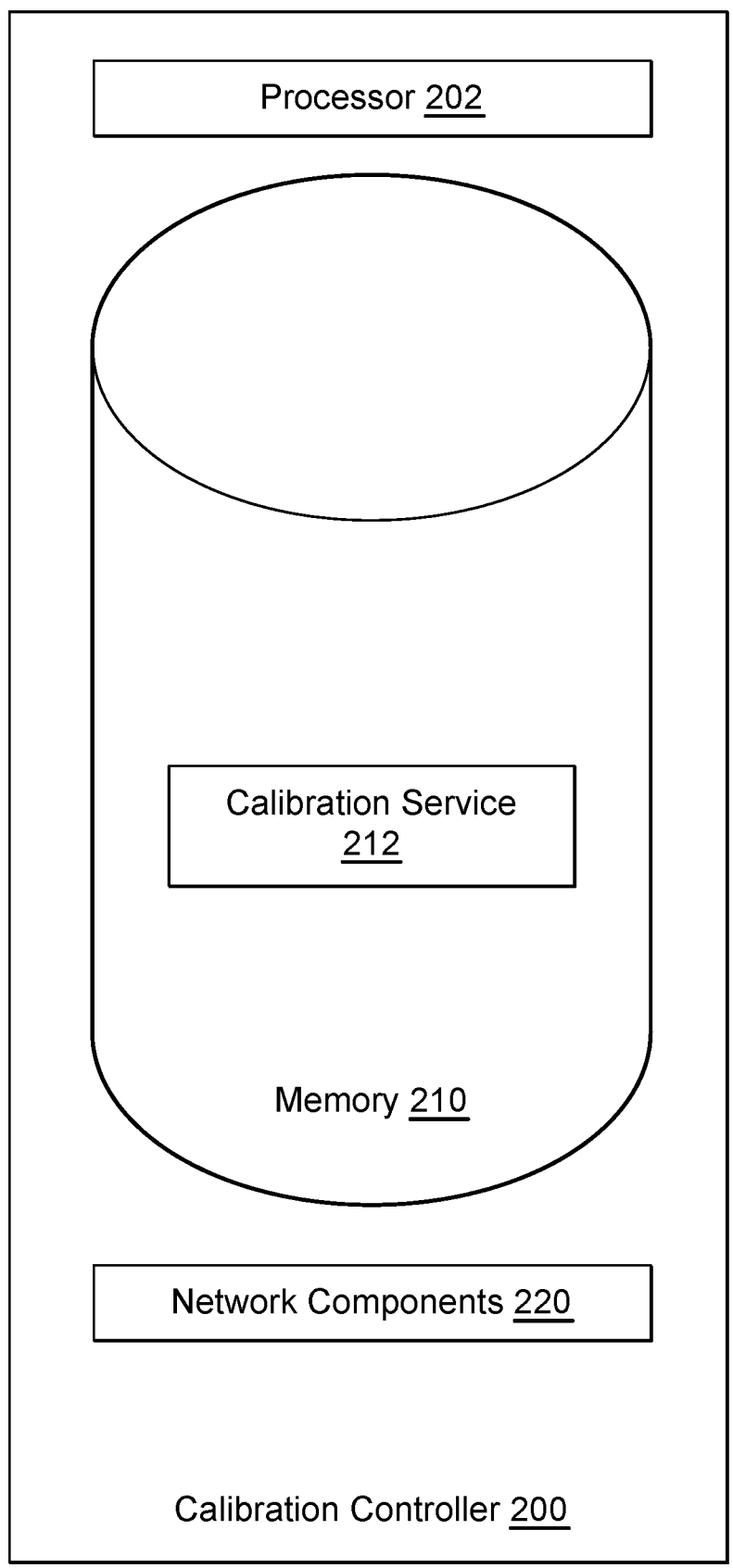
FIG. 2 illustrates a calibration controller for calibrating primary and auxiliary receivers for wireless communication, according to one embodiment.

FIG. 2 illustrates a calibration controller 200 for calibrating primary and auxiliary receivers for wireless communication, according to one embodiment. As discussed above, in an embodiment primary and auxiliary receivers can be calibrated during manufacturing, during operation, or at any other suitable phase. Thus, the calibration controller 200 can correspond to a controller used during manufacturing (e.g., a testing or quality assurance controller), during operation (e.g., an operational controller), or during any other suitable phase. Further, while the calibration controller 200 is illustrated as a combined controller, this is merely an example. One or more aspects of calibrating primary and auxiliary receivers can be divided among any suitable number or type of controllers, and can be included in on-premises systems, cloud computing systems, or any other suitable computing systems.

The calibration controller 200 includes a processor 202, a memory 210, and network components 220. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the calibration controller to interface with a communication network (e.g., as part of a manufacturing environment, operational environment, or any other suitable environment). For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the calibration controller 200. The program code is generally described as various functional "applications" or "modules" within the memory 210, although alternate implementations may have different functions and/or combinations of functions. Within the memory 210, the calibration service 212 facilitates calibration of a primary and auxiliary radio. This is discussed further, below, with regard to FIGS. 3-6.

FIG. 3 illustrates calibrating primary and auxiliary receivers for wireless communication, according to one embodiment. In an embodiment, a system 300 illustrates a four stream receiver (e.g., similar to the system 100 illustrated in FIG. 1). The system 300 includes primary radios 312, 314, 316, 318. Each of the radios 312, 314, 316, and 318 is coupled to a splitter 302. In an embodiment, the splitter 302 is a fully passive splitter. This is merely an example, and the splitter 302 can be any suitable splitter (e.g., an active splitter).

Each primary radio 312, 314, 316, and 318 is associated with a respective receiver/transmitter chain, including a respective coupler 322, 324, 326, or 328, and a respective receiver/transmitter 352, 354, 356, or 358. For example, the primary radio 318 is associated with the coupler 328 and the receiver/transmitter 358. The primary radio 316 is associated with the coupler 326 and the receiver/transmitter 356. The primary radio 314 is associated with the coupler 324 and the receiver/transmitter 354. The primary radio 312 is associated with the coupler 322 and the receiver/transmitter 352. In an embodiment, each coupler 322, 324, 326, and 328 is a passive coupler. For example, like the couplers 122, 124, 126, and 128 illustrated in FIG. 1, the couplers 322, 324, 326, and 328 can be passive PCB couplers with very high isolation (e.g., 40 dB or higher). This is merely an example, and any suitable coupler or combination of couplers can be used.

Further, the system 300 includes a number of auxiliary radios 360A-D (e.g., out-of-band radios), each associated with a respective auxiliary receiver 364A-D. In an embodiment, one or more primary receivers 352, 354, 356, and 358 are calibrated with one or more auxiliary receivers 360A-D. For example, the primary receiver 352B can be calibrated with the auxiliary receiver 364A using a connection 370.

In an embodiment, splitter 302 can control injection of a reference signal for calibration. For example, the transmitter 352A can provide the reference signal, and the splitter 302 can divide the reference signal among the various receiver/transmitter chains 352, 354, 356, and 358. The reference signal can be transmitted from the splitter 302 to the receivers 352 and 364A (e.g., using the couplers 322 and 338 (e.g., a passive coupler 338) and the switch 362A). The system 100 can then use this reference signal, provided by the same antenna to both the primary receiver 352B and the auxiliary receiver 364B, to calibrate the primary receiver 352B and the auxiliary receiver 364A. This is discussed further, below, with regard to FIGS. 4-5.

Figure 4:
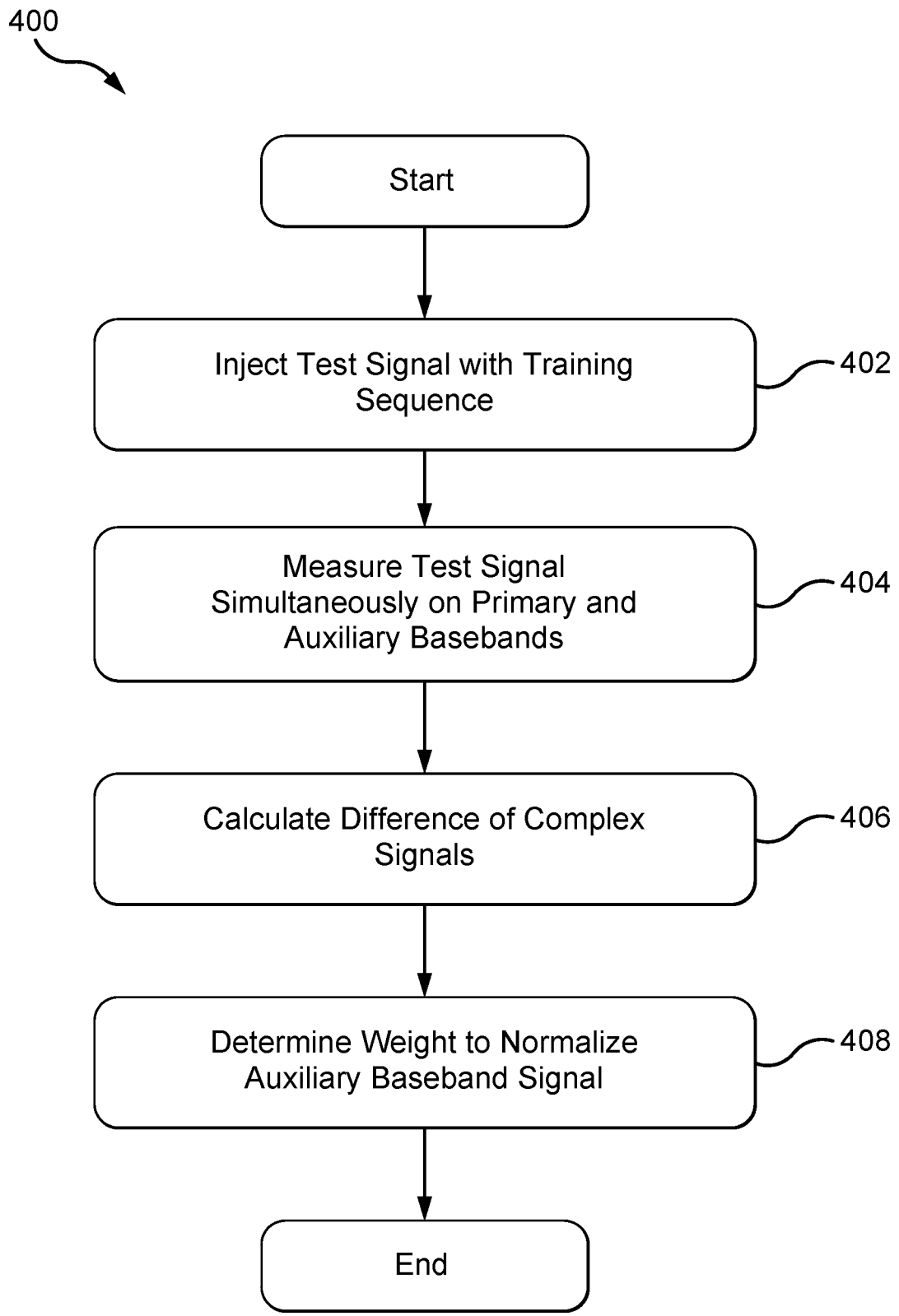
FIG. 4 is a flowchart illustrating calibrating primary and auxiliary receivers for wireless communication, according to one embodiment.
Figure 5:
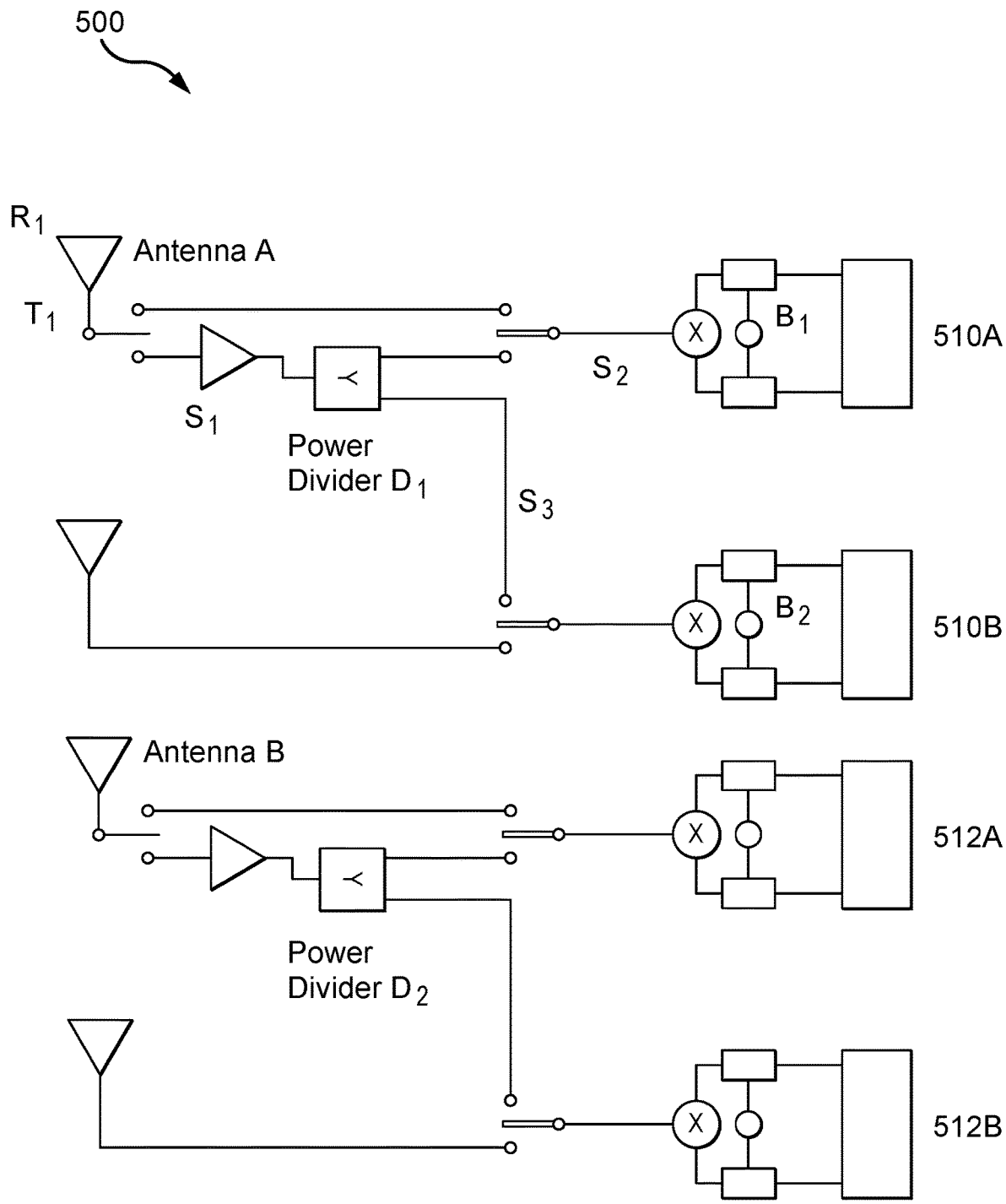
FIG. 5 further illustrates calibrating primary and auxiliary receivers for wireless communication, according to one embodiment.

FIG. 4 is a flowchart 400 illustrating calibrating primary and auxiliary receivers for wireless communication, according to one embodiment. At block 402 a calibration service (e.g., the calibration service 212 illustrated in FIG. 2) injects a test signal with a training sequence into the antenna path. For example, using the example of FIG. 3, the calibration service can inject a test sequence at the transmitter 352A. This test sequence can include a suitable training sequence, used to compare and calibrate a primary receiver (e.g., the primary receiver 352A illustrated in FIG. 3) with an auxiliary radio (e.g., the auxiliary receiver 364A illustrated in FIG. 3).

At block 404, the calibration service measures the test signal simultaneously on the primary and auxiliary basebands. For example, the calibration service can measure a test signal transmitted by the transmitter 352A simultaneously at the primary receiver 352B and the auxiliary receiver 364A.

At block 406, the calibration service calculates the difference of complex signals. For example, the calibration service can subtract the complex signals received simultaneously on the primary and auxiliary basebands (e.g., as discussed above in relation to block 404) and calculate the difference. This is discussed further, below, with regard to FIG. 5.

At block 408, the calibration service determines weights to normalize the auxiliary baseband signal. For example, the calibration service can use the difference calculated at block 406 to determine the weight used to normalize the auxiliary baseband signal to the out-of-band performance of the primary baseband signal. This is discussed further, below, with regard to FIG. 5.

In one embodiment, the primary and auxiliary receivers are calibrated by subtracting simultaneously received complex signals. Alternatively, or in addition, the primary and auxiliary receivers can be calibrated using ratios of signals, and then multiplying the incoming signal by the complex ratio determined during training. This is discussed further, below, with regard to FIG. 5. These are merely examples, and any suitable technique can be used to calculate the difference of the complex signals.

FIG. 5 further illustrates calibrating primary and auxiliary receivers for wireless communication, according to one embodiment. In an embodiment, a system 500 includes antennas A and B (e.g., corresponding to any two of the radios 312, 314, 316, and 318 illustrated in FIG. 3), primary receivers 510A and 512A (e.g., corresponding to any two of the receiver/transmitters 352, 354, 356, and 358 illustrated in FIG. 3), and auxiliary receivers 510B and 512B (e.g., corresponding to any two of the auxiliary receivers 364A-D illustrated in FIG. 3).

As illustrated, the system 500 can be used to calibrate the primary receiver 510A (e.g., receiving an in-band channel) with an auxiliary receiver 510B (e.g., receiving an out-ofband channel). To determine the out-of-band (e.g., received at the auxiliary receiver 510B) channel condition of an active receiver (e.g., the primary receiver 510A), the signal is sampled from the same antenna(s) as the in-band (primary) receiver. That is, a signal $S_1$ is sampled from the antenna A, for both the primary receiver 510A and the auxiliary receiver 510B.

In an embodiment, a training signal $T_1$ is injected into the antenna path (e.g., at the input of the antenna A). For example, the training signal $T_1$ can have a predetermined frequency. The training signal is amplified and then divided at a power divider $D_1$ (e.g., a Wilkinson power divider or any other suitable power divider). A signal $S_3$ is output from the power divider $D_1$, provided to the auxiliary receiver 510B and measured as a signal $B_2$. A signal $S_2$ is also output from the power divider $D_1$, provided to the primary receiver 510A and measured as a signal $B_1$.

In an embodiment, the auxiliary receiver 510B can be calibrated with the primary receiver 510A using the equations below:

$$B_1(t)=T_1(t)-S_1(t)-S_2(t)$$

$$B_2(t)=T_1(t)-S_1(t)-S_3(t)$$

$$B_1-B_2=T_1-S_1-S_2-T_1+S_1-S_3$$

$$\Delta B(t)=S_2(t)-S_3(t)$$

Taking the received signal from the antennal A and adding a calibration factor:

$$B_2(t)+\Delta B(t)=R(t)-S_1(t)-S_3(t)+\Delta B(t)=R(t)-S_1(t)-S_2(t)$$
$$=B_1(t).$$

In an embodiment, thus, the complex weight $\Delta B$ can be used to assess the training sequence of an out-of-band scan while still receiving in band signals. In an embodiment, this is a cost-effective solution as only one switch and a one power divider are required and the power divider could be implemented cheaply (e.g., using microstrip on the board).

The equations above provide one example technique for calibrating primary and auxiliary receivers by subtracting simultaneously received complex signals. This is merely one example. Alternatively, or in addition, the primary and auxiliary receivers can be calibrated using ratios of signals, and then multiplying the incoming signal by the complex ratio determined during training (e.g., calibration).

Figure 6:
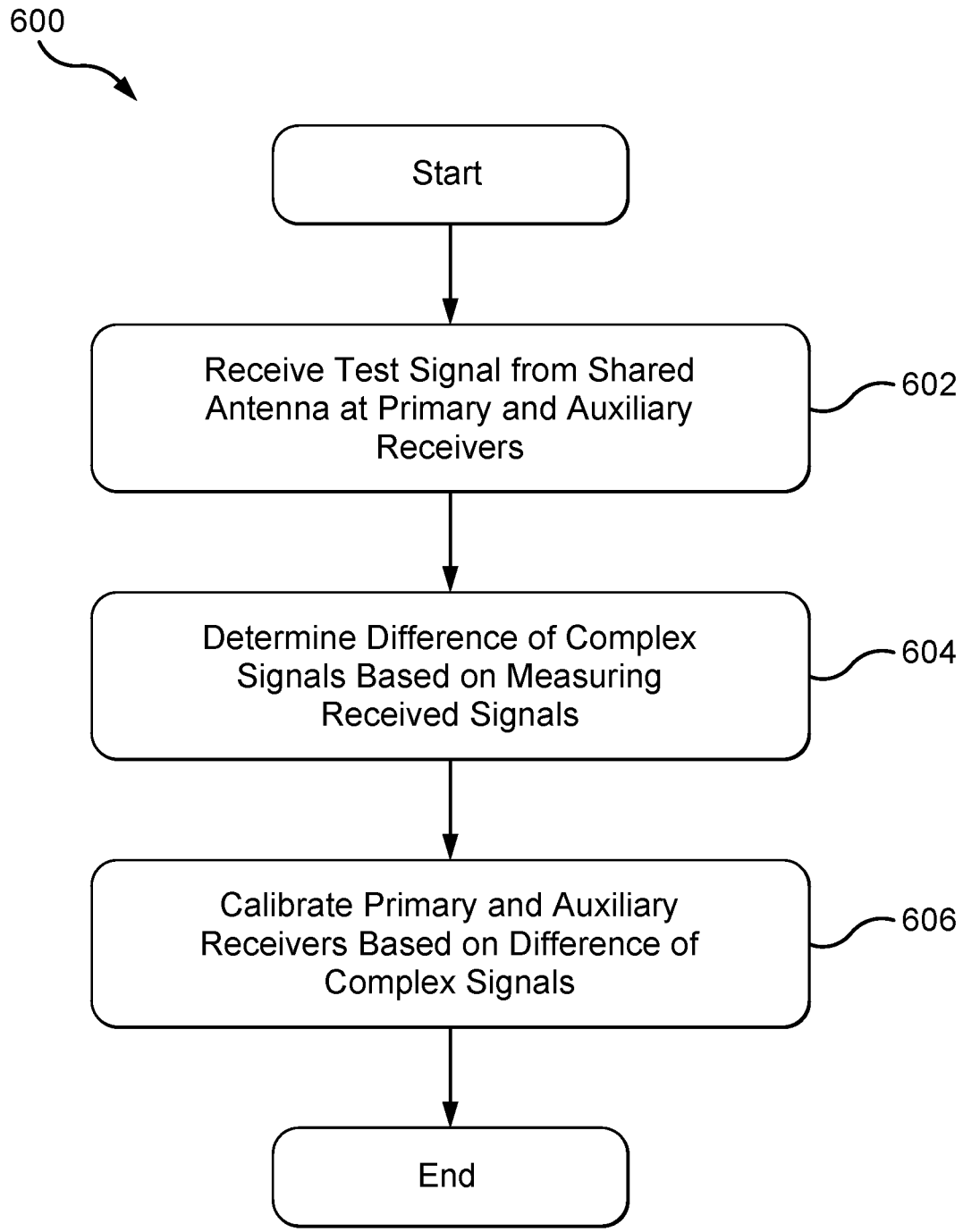
FIG. 6 is a flowchart further illustrating calibrating primary and auxiliary receivers for wireless communication, according to one embodiment.

FIG. 6 is a flowchart 600 further illustrating calibrating primary and auxiliary receivers for wireless communication, according to one embodiment. At block 602 a calibration service (e.g., the calibration service 212 illustrated in FIG. 2) receives a test signal from a shared antenna at primary and auxiliary receivers. For example, as illustrated above in relation to FIG. 3, a shared antenna can inject a test signal (e.g., using the transmitter 352A) into the antenna path that is received at both a primary receiver (e.g., the primary receiver 352B) and an auxiliary receiver (e.g., the auxiliary receiver 364A). Similarly, using FIG. 5 as an example, a shared antenna A can inject a test signal that is received at a primary receiver 510A and an auxiliary receiver 510B.

At block 604, the calibration service determines a difference of complex signals based on measuring the received signals (e.g., the signals received at the primary and auxiliary receivers at block 602). For example, as discussed above in relation to FIG. 5, above, the calibration service can measure signals received at the primary receiver and auxiliary receiver (e.g., signals received at least partially simultaneously), and can subtract the complex signals to determine the difference of the complex signals. This is merely one example. Alternatively, or in addition, the calibration service can determine the difference of the complex signals by using ratios of signals. These are merely examples, and any suitable technique can be used.

At block 606, the calibration service calibrates the primary and auxiliary receivers based on the difference of complex signals (e.g., determined at block 604). For example, as discussed above in relation to block 408 illustrated in FIG. 4, the calibration service can determine weights to normalize the auxiliary baseband signal. For example, the calibration service can use the difference in complex signals determined at block 604 to determine the weight used to normalize the auxiliary baseband signal to the out-of-band performance of the primary baseband signal.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
receiving a signal from a wireless radio antenna at a first receiver and a second receiver in a wireless communication system,
   wherein the first receiver is configured to receive in-band transmission during operation of the wireless communication system and the second receiver is configured to receive out-of-band transmission during operation of the wireless communication system, and
   wherein the signal is transmitted at least partially simultaneously from the wireless radio antenna to the first receiver and the second receiver;
determining a difference of complex signals for the first receiver and the second receiver based on measuring the signal as received from the wireless radio antenna at the first receiver and the signal as received from the wireless radio antenna at the second receiver; and
calibrating the second receiver with the first receiver based on the difference of complex signals.

2. The method of claim 1, further comprising:
determining spatial information for an out-of-band sounding signal, for the wireless communication system, using the second receiver.

3. The method of claim 2, wherein the spatial information is used to select a channel, among a plurality of channels, for use by a wireless device in the wireless communication system.

4. The method of claim 1, wherein determining the difference of complex signals for the first receiver and the second receiver comprises subtracting the signal as received from the wireless radio antenna at the first receiver and the signal as received from the wireless radio antenna at the second receiver.

5. The method of claim 1, wherein determining the difference of complex signals for the first receiver and the second receiver comprises identifying a ratio of the signal as received from the wireless radio antenna at the first receiver and the signal as received from the wireless radio antenna at the second receiver.

6. The method of claim 1, wherein calibrating the second receiver with the first receiver based the difference of complex signals comprises:
determining one or more weights to normalize the second receiver with the first receiver.

7. The method of claim 1, further comprising:
injecting the signal into a path for the wireless radio antenna, wherein the signal is a test signal comprising a training sequence.

8. The method of claim 1, wherein the calibrating is performed during manufacturing of a component of the wireless communication system.

9. The method of claim 1, wherein the calibrating is performed during operation of the wireless communication system, based on identifying an operating condition of the wireless communication system.

10. A wireless communication system, comprising:
a wireless radio antenna;
a first receiver;
a second receiver;
one or more processors; and
one or more memories storing a program, which, when executed on any combination of the one or more processors, performs operations, the operations comprising:
   receiving a signal from the wireless radio antenna at the first receiver and the second receiver in the wireless communication system,
      wherein the first receiver is configured to receive in-band transmission during operation of the wireless communication system and the second receiver is configured to receive out-of-band transmission during operation of the wireless communication system, and wherein the signal is transmitted at least partially simultaneously from the wireless radio antenna to the first receiver and the second receiver;

determining a difference of complex signals for the first receiver and the second receiver based on measuring the signal as received from the wireless radio antenna at the first receiver and the signal as received from the wireless radio antenna at the second receiver; and calibrating the second receiver with the first receiver based on the difference of complex signals.

11. The system of claim 10, the operations further comprising:

determining spatial information for an out-of-band sounding signal, for the wireless communication system, using the second receiver.

12. The system of claim 11, wherein the spatial information is used to select a channel, among a plurality of channels, for use by a wireless device in the wireless communication system.

13. The system of claim 10, wherein determining the difference of complex signals for the first receiver and the second receiver comprises subtracting the signal as received from the wireless radio antenna at the first receiver and the signal as received from the wireless radio antenna at the second receiver.

14. The system of claim 10, wherein determining the difference of complex signals for the first receiver and the second receiver comprises identifying a ratio of the signal as received from the wireless radio antenna at the first receiver and the signal as received from the wireless radio antenna at the second receiver.

15. The system of claim 10, wherein calibrating the second receiver with the first receiver based the difference of complex signals comprises:

determining one or more weights to normalize the second receiver with the first receiver.

16. A non-transitory computer-readable medium containing computer program code that, when executed by operation of one or more computer processors, performs operations comprising:

receiving a signal from a wireless radio antenna at a first receiver and a second receiver in a wireless communication system, wherein the first receiver is configured to receive in-band transmission during operation of the wireless communication system and the second receiver is configured to receive out-of-band transmission during operation of the wireless communication system, and wherein the signal is transmitted at least partially simultaneously from the wireless radio antenna to the first receiver and the second receiver;

determining a difference of complex signals for the first receiver and the second receiver based on measuring the signal as received from the wireless radio antenna at the first receiver and the signal as received from the wireless radio antenna at the second receiver; and calibrating the second receiver with the first receiver based on the difference of complex signals.

17. The non-transitory computer-readable medium of claim 16, the operations further comprising:

determining spatial information for an out-of-band sounding signal, for the wireless communication system, using the second receiver.

18. The non-transitory computer-readable medium of claim 17, wherein the spatial information is used to select a channel, among a plurality of channels, for use by a wireless device in the wireless communication system.

19. The non-transitory computer-readable medium of claim 16, wherein determining the difference of complex signals for the first receiver and the second receiver comprises at least one of: (i) subtracting the signal as received from the wireless radio antenna at the first receiver and the signal as received from the wireless radio antenna at the second receiver and (ii) identifying a ratio of the signal as received from the wireless radio antenna at the first receiver and the signal as received from the wireless radio antenna at the second receiver.

20. The non-transitory computer-readable medium of claim 16, wherein calibrating the second receiver with the first receiver based the difference of complex signals comprises:

determining one or more weights to normalize the second receiver with the first receiver.

* * * * *